(12) United States Patent
Suzuki et al.

(10) Patent No.: US 6,909,458 B1
(45) Date of Patent: Jun. 21, 2005

(54) CAMERA CONTROL SYSTEM AND METHOD, AND STORAGE MEDIUM FOR SELECTIVELY CONTROLLING ONE OR MORE CAMERAS

(75) Inventors: Kazuko Suzuki, Yokohama (JP); Tomoaki Kawai, Yokohama (JP); Kenji Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 796 days.

(21) Appl. No.: 09/669,330

(22) Filed: Sep. 25, 2000

(30) Foreign Application Priority Data

Sep. 27, 1999 (JP) ............................................ 11-272945

(51) Int. Cl.[7] ........................ H04N 5/232; H04N 5/225; H04N 7/18
(52) U.S. Cl. ................ 348/211.8; 348/159; 348/207.11
(58) Field of Search ............................. 348/14.04, 143, 348/152, 153, 159, 207.1, 207.11, 211.99, 211.3, 169, 211.7, 211.8, 211.11, 211.12, 211.03, 211.07, 211.08

(56) References Cited

U.S. PATENT DOCUMENTS

| | | | | |
|---|---|---|---|---|
| 4,516,156 A | * | 5/1985 | Fabris et al. ............. 348/211.8 |
| 4,992,866 A | * | 2/1991 | Morgan ....................... 348/159 |
| 5,164,827 A | * | 11/1992 | Paff ............................ 348/143 |
| 5,745,166 A | * | 4/1998 | Rhodes et al. .............. 348/143 |
| 5,844,597 A | * | 12/1998 | Kettler et al. ............ 348/14.08 |
| 6,088,737 A | * | 7/2000 | Yano et al. ................. 709/235 |
| 6,239,836 B1 | * | 5/2001 | Suzuki et al. ............ 348/211.3 |
| 6,359,647 B1 | * | 3/2002 | Sengupta et al. ........... 348/143 |
| 6,529,853 B1 | * | 3/2003 | Bauer ......................... 702/152 |
| 2003/0058342 A1 | * | 3/2003 | Trajkovic ................ 348/207.1 |

FOREIGN PATENT DOCUMENTS

| | | | | |
|---|---|---|---|---|
| EP | 734157 A2 | * | 9/1996 | .......... H04N/5/232 |
| JP | 09093573 A | * | 4/1997 | ............ H04N/7/18 |

* cited by examiner

Primary Examiner—Wendy R. Garber
Assistant Examiner—John M. Villecco
(74) Attorney, Agent, or Firm—Morgan & Finnegan, LLP

(57) ABSTRACT

An object of this invention is to provide a camera control system for improving a camera control function at a control terminal. To achieve this object, a camera control system for selecting one or more cameras from a plurality of controllable cameras connected to a network, and performing video display and camera control includes a map display monitor, a mouse for designating one point on a map displayed by the monitor, a camera selection unit for selecting an optimal camera capable of monitoring the point designated by the mouse, and a camera control unit for controlling the camera selected by the camera selection unit.

26 Claims, 13 Drawing Sheets

FIG. 6

AREA TABLE

| AREA | CAMERA ID | CAMERA PARAMETER ( P, T, Z ) |
|---|---|---|
| 80 | 90 | ( 0, 10, 2 ) |
| | 92 | ( −45, −10, 4 ) |
| 81 | 92 | ( 0, 25, 8 ) |
| | 91 | ( 60, 30, 3 ) |
| 82 | 93 | ( −10, 0, 2 ) |
| 90 | 91 | ( −8, 0, 1 ) |
| | 92 | ( −10, 10, 3 ) |

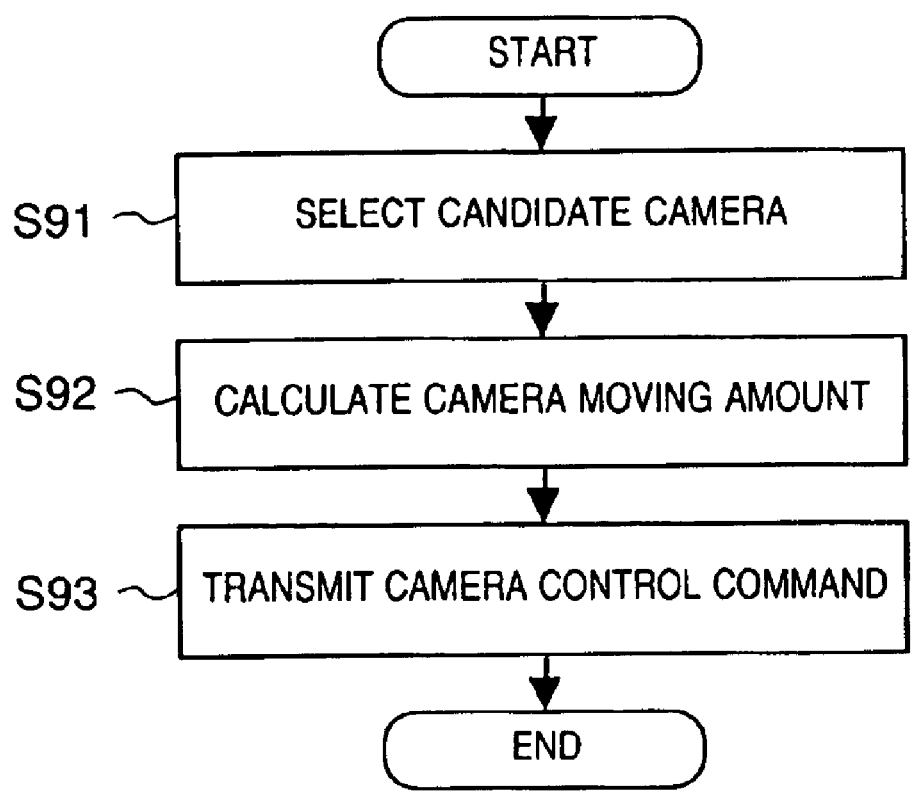

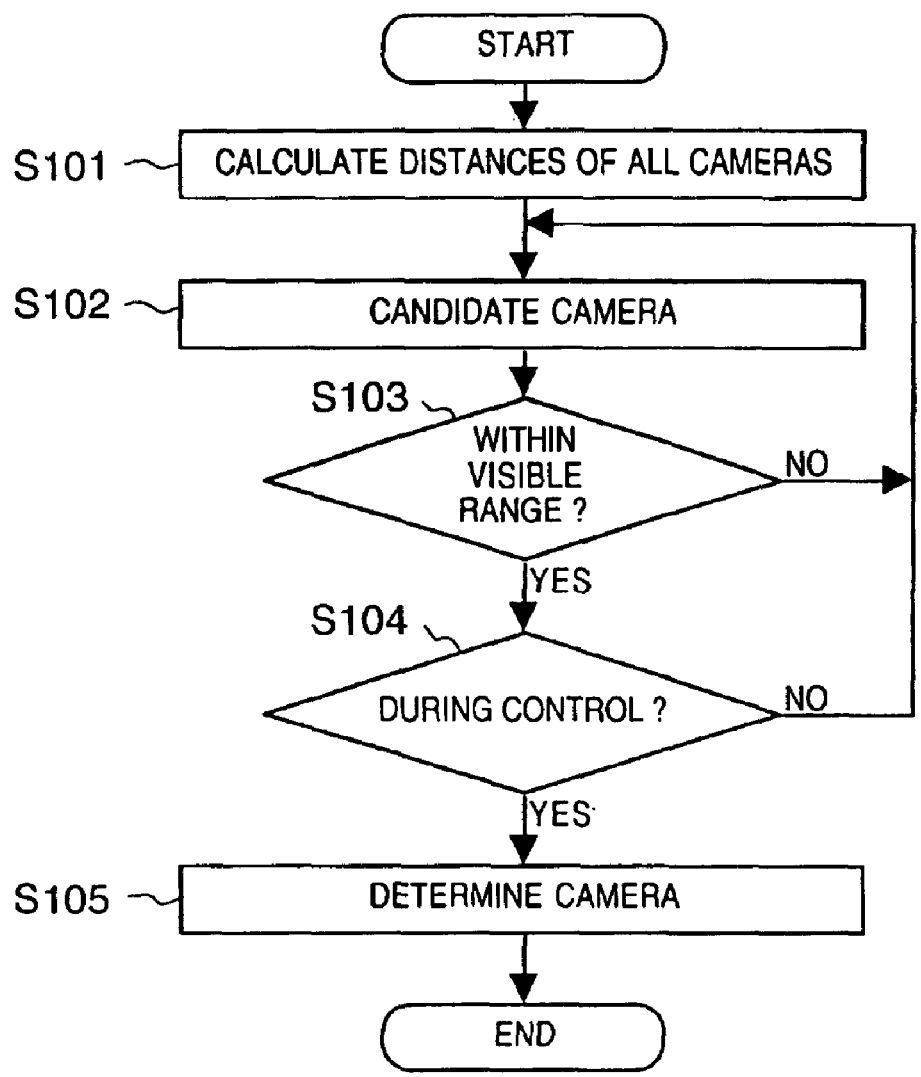

FIG. 11A

FIXED INFORMATION

| CAMERA NUMBER | CAMERA NAME | HOST NAME | INSTALLATION POSITION | INITIAL DIRECTION | MAXIMUM ZOOM RATIO | MAXIMUM FIELD ANGLE | PANNABLE DIRECTION |
|---|---|---|---|---|---|---|---|
| 1 | camera1 | host1 | (150, 11) | 180 | 8.0 | 120 | (120, 240) |
| 2 | camera2 | ------ | ------ | ------ | ------ | ------ | ------ |

FIG. 11B

VARIABLE INFORMATION

| CAMERA NUMBER | ZOOM RATIO | VIDEO FIELD ANGLE | CURRENT IMAGE SENSING DIRECTION | IMAGE SENSING RANGE | DURING CAMERA CONTROL |
|---|---|---|---|---|---|
| 1 | 3.0 | 40 | 145 | (125, 165) | Y |
| 2 | ------ | ------ | ------ | ------ | N |

CAMERA CONTROL SYSTEM AND METHOD, AND STORAGE MEDIUM FOR SELECTIVELY CONTROLLING ONE OR MORE CAMERAS

FIELD OF THE INVENTION

The present invention relates to a camera control system and method capable of controlling one or more video cameras connected to a network, and a storage medium.

BACKGROUND OF THE INVENTION

A camera control system capable of remotely controlling one or a plurality of monitoring cameras from a remote place has conventionally been known. In this system, either each camera is fixed to a camera platform to always direct to one direction, or its pan, tilt, and zoom can be externally controlled. The latter camera generally incorporates a function of remotely controlling the image sensing direction and magnification from a surveillance center.

In remotely controlling a plurality of cameras, the arrangement location and direction of each camera must be indicated to the operator. For example, the present applicant has already proposed a camera control system of displaying a graphic pattern (camera icon) representing a camera at a position corresponding to the installation position of each camera superposed on the map of a shop, factory, or building in a surveillance system of installing many cameras in the shop, factory, or building and remotely controlling the cameras.

This camera control system requires a user interface capable of various camera control operations by operating a camera icon on a map with a pointing device such as a mouse. For this purpose, the present applicant has also proposed a method capable of controlling the direction and zoom of a camera by displaying a graphic pattern representing the image sensing range such as a current camera direction and field angle superposed on a camera icon so as to manipulate the graphic pattern with the mouse.

However, demands have arisen for further improvement of the camera control function at a control terminal operable by the user.

SUMMARY OF THE INVENTION

The present invention has been made to overcome the conventional drawbacks, and has as its object to provide a camera control system and method of further improving a camera control function at a control terminal, and a storage medium.

In order to solve the above problems and achieve the above object, a camera control system of the present invention is characterized by the following arrangement according to its first aspect.

There is provided a camera control system for selecting at least one of a plurality of controllable cameras connected to a network, and performing video display and camera control, comprising map display means, input means for designating one point on a map displayed by said map display means, camera selection means for selecting an optimal camera capable of monitoring the point designated by said input means, and camera control means for controlling the camera selected by said camera selection means.

A camera control method of the present invention is characterized by the following process according to its first aspect.

There is provided a camera control method of selecting at least one of a plurality of controllable cameras connected to a network, and performing video display and camera driving, comprising the display step of displaying a map on a display, the designation step of designating one point on the map displayed in the display step, the camera selection step of selecting an optimal camera capable of monitoring the point designated in the designation step, and the driving step of driving the camera selected in the camera selection step.

A storage medium of the present invention is characterized by the following arrangement according to its first aspect.

There is provided a storage medium storing a control program of selecting at least one of a plurality of controllable cameras connected to a network, and performing video display and camera driving, wherein the control program comprises a code of the display step of displaying a map on a display, a code of the designation step of designating one point on the map displayed in the display step, a code of the camera selection step of selecting an optimal camera capable of monitoring the point designated in the designation step, and a code of the driving step of driving the camera selected in the camera selection step.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 is a table for explaining the structure and contents of an area table;

FIG. 9 is a flow chart showing processing additionally executed in the second embodiment;

FIG. 10 is a flow chart showing a camera selection method;

FIGS. 11A and 11B are tables for explaining the structure and contents of a camera state table managed by a camera management server;

DETAILED DESCRIPTION OF THE PREFERRED EMBODIMENTS

Preferred embodiments of the present invention will be described in detail below with reference to the accompanying drawings.

(First Embodiment)

Figure 1:
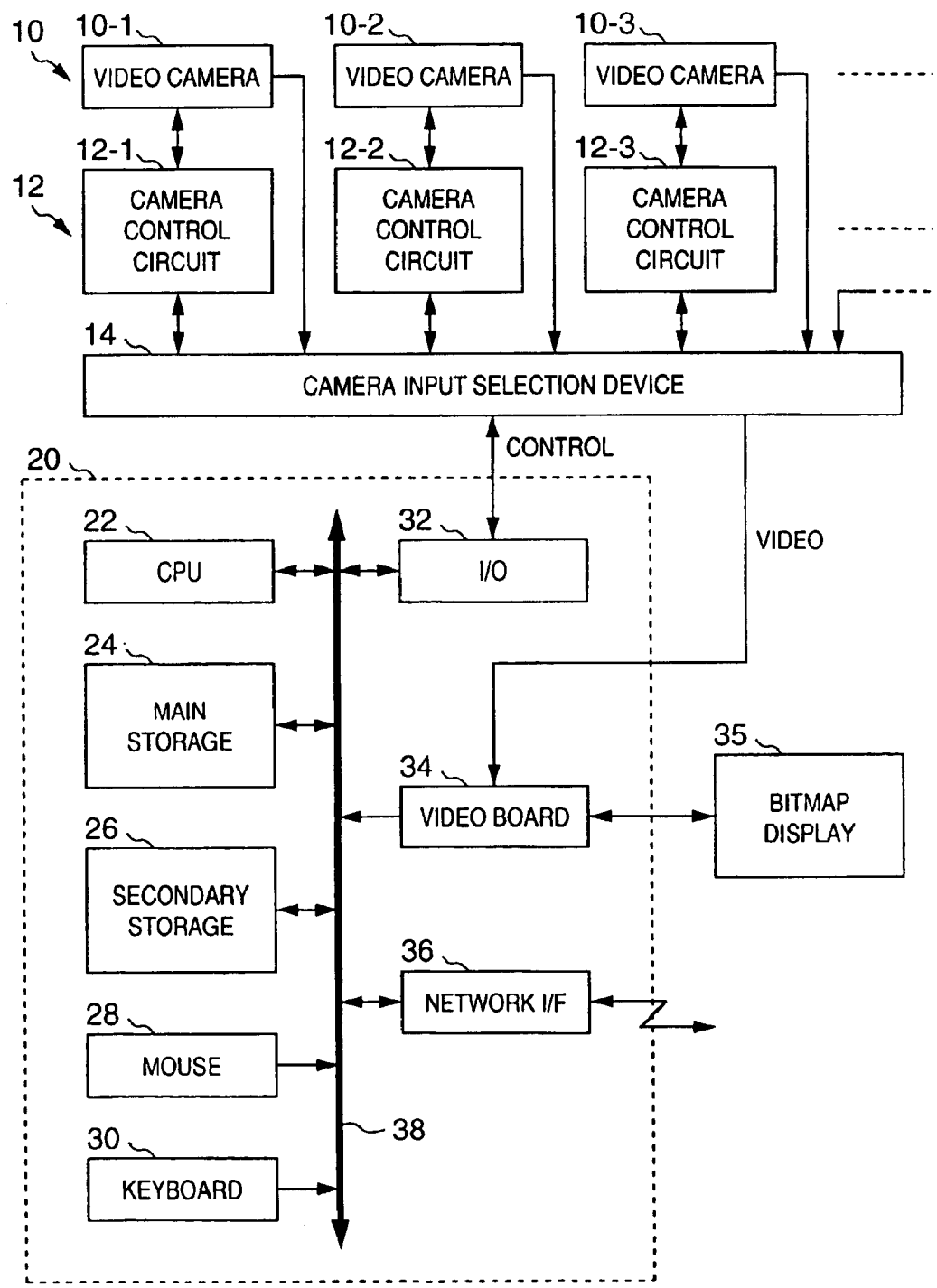
FIG. 1 is a schematic block diagram showing the basic arrangement of a computer system according to the first embodiment of the present invention.

FIG. 1 is a block diagram showing the schematic arrangement of a video communication terminal serving as a basic element, i.e., a computer system connected to a plurality of cameras in the first embodiment of the present invention. One or more computers having the arrangement shown in FIG. 1 and/or one or more computers having a similar arrangement are connected to each other via a computer network.

In FIG. 1, reference numeral 10 (10-1, 10-2, 10-3, . . . ) denote video cameras; 12 (12-1, 12-2, 12-3, . . . ), camera control circuits for directly controlling the pan, tilt, zoom, focus adjustment, and stop value of the video cameras 10 (10-1, 10-2, 10-3, . . . ) in accordance with external control signals; and 14, a camera input selection device for selecting which of the video cameras 10 is to be controlled, and which of their output signals (in general, video signals, but video and audio signals for a camera with a microphone) is to be received. An example of a control signal line is an RS-232C line, but the present invention is not limited to this.

Reference numeral 20 denotes a video communication terminal for sending a control command to a desired camera control circuit 12 via the camera input selection device 14 to control the video camera 10 corresponding to this camera control circuit 12, transmitting an image of a selected camera to the network, and receiving an image from the network; 22, a CPU for controlling the entire system; 24, a main storage; 26, a secondary storage (e.g., hard disk); 28, a mouse as a pointing device; and 30, a keyboard.

Reference numeral 32 denotes an I/O port connected to the camera input selection device 14 to supply a camera control command and the like to the camera input selection device 14; 34, a video board for receiving an output video signal from a video camera 10 selected by the camera input selection device 14, and displaying various images on a bitmap display 35; 36, a network interface for connecting the video communication terminal 20 to a computer network or communication network; and 38, a system bus for connecting the respective devices from the CPU 22 to the network interface 36 to each other. The network interface 36 can transmit a camera control signal from a remote place to the video communication terminal 20 via the network to control the video camera 10.

The camera input selection device 14 selects one of control signal lines connected to the camera control circuits 12 and one of video outputs, supplies the selected video output to the video board 34, and logically connects the selected control signal line to the I/O port 32. An example of the video signal format is a luminance/color difference separation type NTSC signal format. The video board 34 receives the video output selected by the camera input selection device 14. The received video signal is displayed as a moving picture in a predetermined window on the bitmap display 35, and/or transmitted to another device.

The secondary storage 26 stores various pieces of information about the camera 10 or another camera connected via the network, e.g., camera position information data and camera graphic pattern data. Details of these pieces of information will be described later.

When only one camera 10 is connected, the camera input selection device 14 can be omitted, and the camera control circuit 12 can be directly connected to the I/O port 32. When no image is transmitted, the camera 10, camera control circuit 12, and camera input selection device 14 can be omitted.

Figure 2:
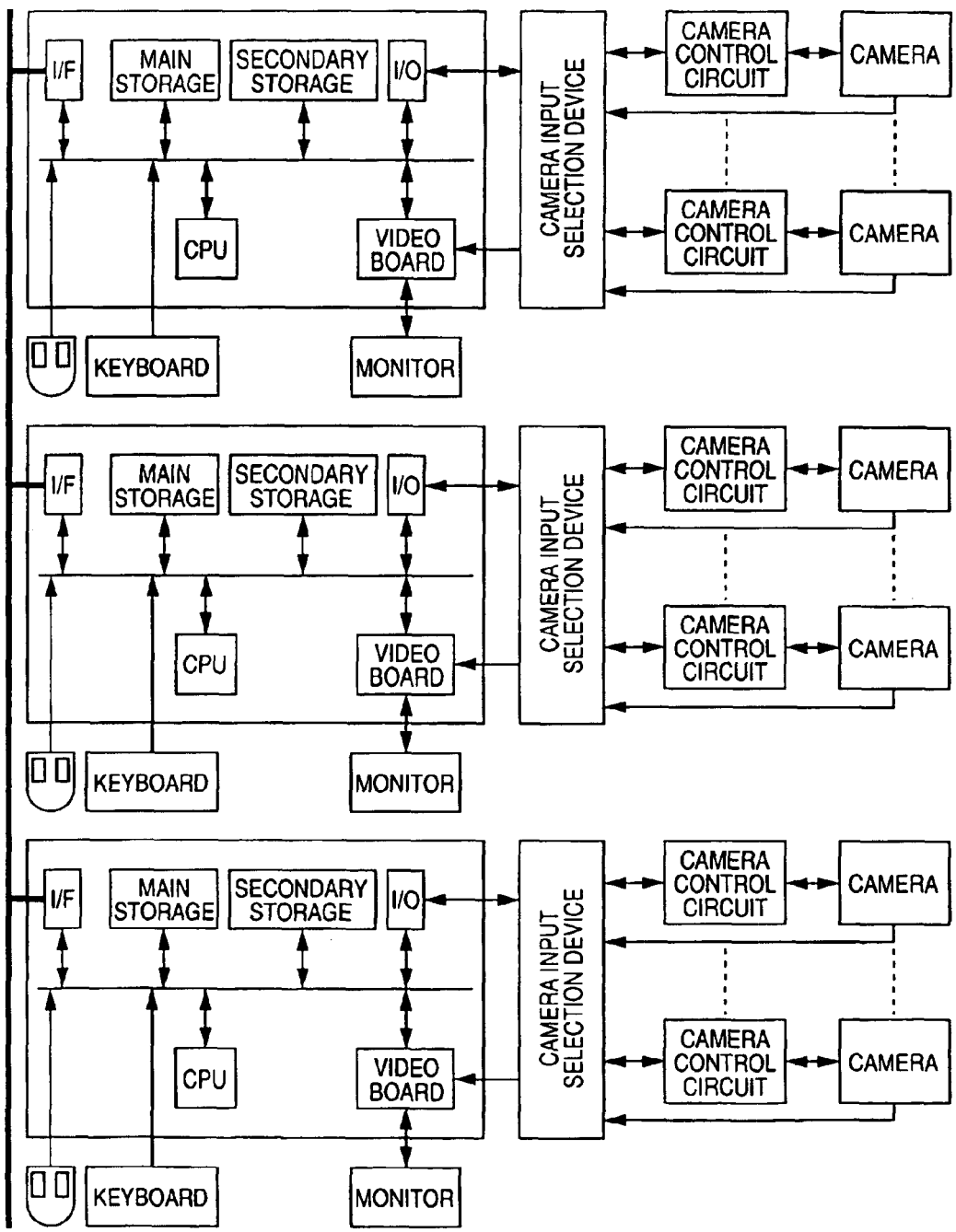
FIG. 2 is a schematic block diagram showing a hardware arrangement in a network.

The apparatus shown in FIG. 1 is connected as a communication terminal to a network, as shown in FIG. 2. All the communication terminals need not have the same arrangement as that shown in FIG. 1. For example, the network may comprise a communication terminal connected to only one camera, or a terminal not connected to any camera (i.e., a terminal having a function of only remotely controlling cameras connected to other terminals and displaying only an image from such cameras). In general, communication terminals having various arrangements coexist in one network. Note that the network adopted in this embodiment assumes a LAN or WAN having a transmission bandwidth wide enough to transmit digital moving picture data and a camera control signal. Moving picture data is generally compressed and transmitted. This embodiment can use various existing methods as a moving picture compression method, and a detailed description thereof will be omitted.

As described above, the video board 34 has a video capture function. The video board 34 supplies received video data to the bitmap display 35 to display an image, and in addition supplies the received video data to the CPU 22 via the bus 38. The CPU 22 packetizes the video data, and outputs the packet to the network via the network interface 36. A camera manipulation instruction and camera switching instruction are also packetized and transmitted to the network via the network interface 36. Information about the entire system is also packetized and transmitted to the network. These pieces of information are transmitted to a specific terminal or all terminals in accordance with the contents of data to be transmitted if needed.

This also applies to reception. More specifically, when each video communication terminal 20 receives packetized video data, camera manipulation instruction, and camera switching instruction, the terminal 20 processes the received video data like capture data, and processes the received camera manipulation instruction and camera switching instruction like internal similar instructions. Information about the entire system is used to update the system display of a user interface (to be described below).

Figure 3:
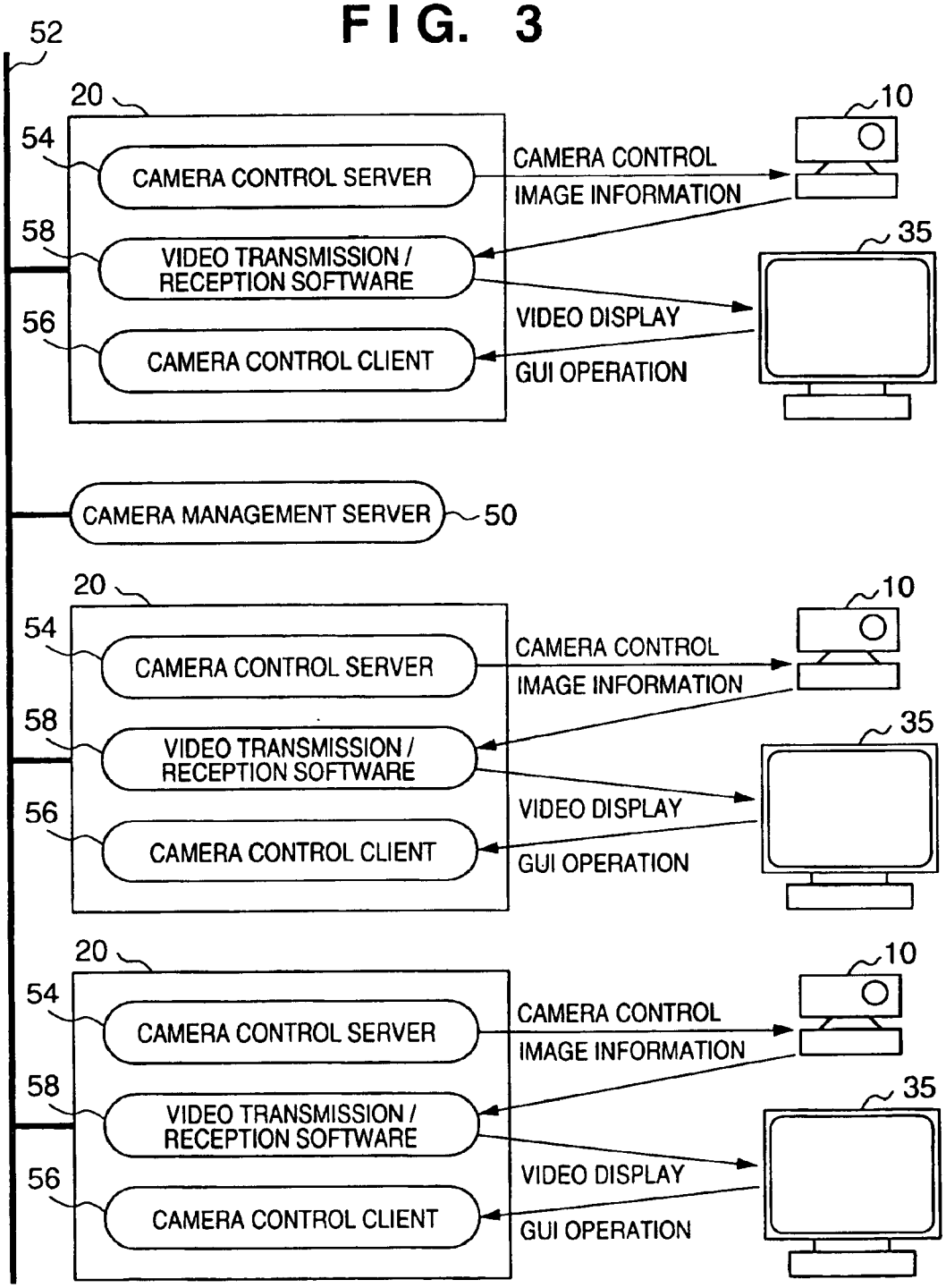
FIG. 3 is a schematic block diagram showing a software arrangement in the network.

FIG. 3 is a block diagram showing a software arrangement in the first embodiment. In FIG. 3, a plurality of video communication terminals 20 and a camera management server 50 are connected to a computer network 52. A camera control server 54 for controlling the camera 10 in accordance with a camera control signal (including a selection signal when a plurality of cameras are connected) input from a self terminal or transmitted from another terminal, a camera control client 56 for remotely controlling the camera 10 of the self terminal or another terminal, and video transmission/reception software 58 for supplying an image from the camera of the self terminal to another terminal via the network 52, and supplying an image transferred from another terminal via the network 52 or an image from the camera 10 of the self terminal to the display 35 of the self terminal are installed in each video communication terminal 20.

The camera management server 50 is software for managing all cameras 10 released (or connected) to the network 52, and holds information such as the camera name, host name, installation position, and current status of each camera. The camera management server 50 manages registration of a camera newly usable via the network 52, and deletion along with disconnection from the network 52. In addition, the camera management server 50 informs all the camera control clients 56 of management information of each camera periodically or in accordance with a request. The camera management server 50 suffices to be stored in one of the terminals connected to the network 52.

The camera control client 56 displays the layout and directions of the camera 10 of the self terminal and all cameras usable via the network 52 by using predetermined camera symbols to be superposed on a map on the screen of the display 35 of the self terminal. The camera control client 56 updates the display state of each camera symbol in real time based on camera information periodically transmitted from the camera management server 50.

Figure 4:
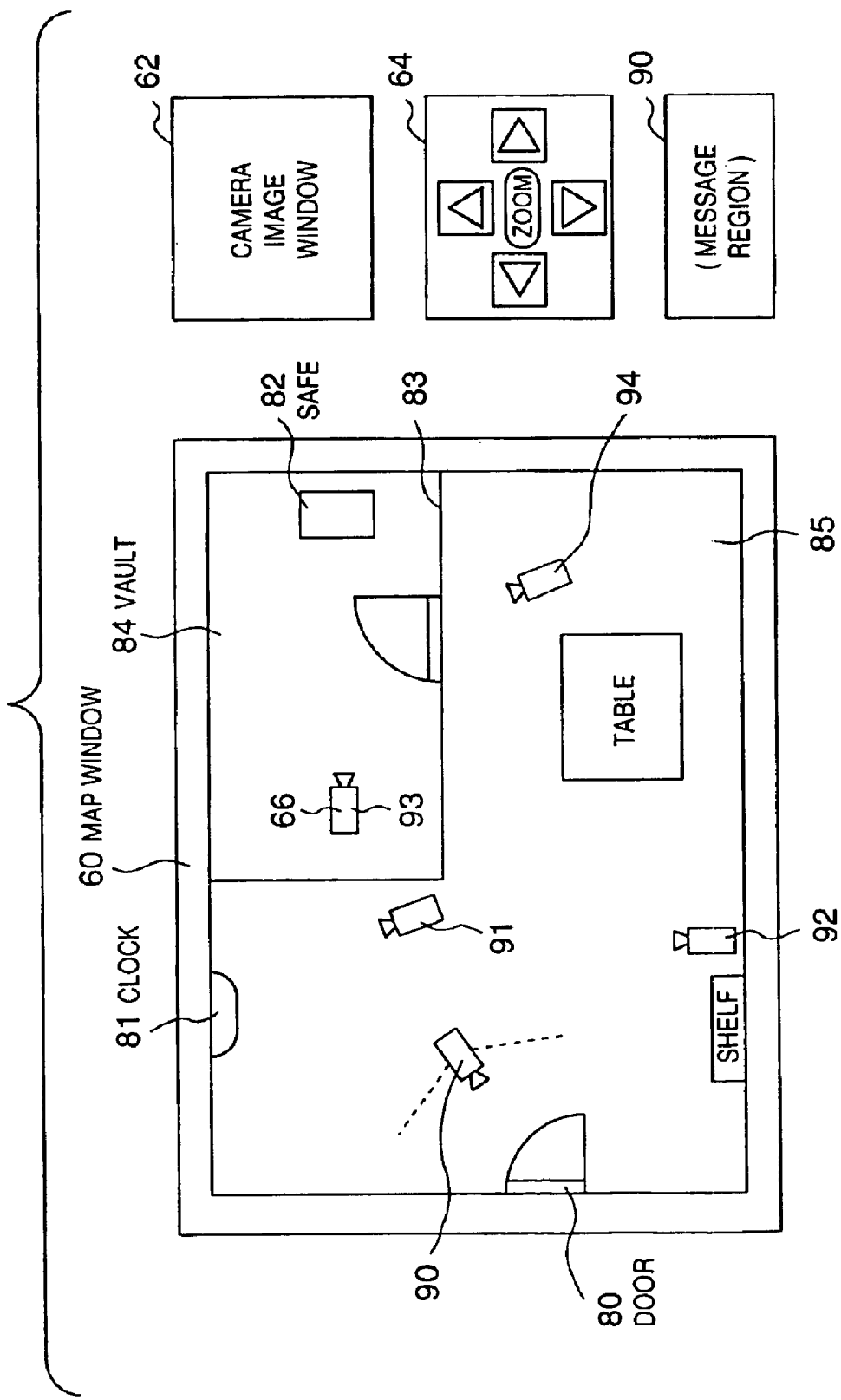
FIG. 4 is a view showing an example of a camera display control panel displayed on a display by a camera control client.

FIG. 4 is a view showing an example of a camera display control panel displayed on the display 35 by the camera control client 56. Reference numeral 60 denotes a map window for displaying a camera icon representing the installation position and direction of each camera superposed on a map showing the installation places of controllable cameras; 62, a camera image window for displaying an image of one selected camera; and 64, a camera control panel which comprises various control buttons, and manipulates the pan, tilt, and zoom of a selected camera. The first embodiment assumes that a window display system capable of simultaneously displaying a plurality of windows runs.

The map window 60 displays a map showing the seat layout of an office, and camera icons 66 representing the locations of respective cameras deployed in the office are displayed on the map. Each camera icon 66 is displayed in almost the same direction as the current camera direction at a position corresponding to the installation location of the corresponding camera. The camera icons 66 are displayed in different colors so as to identify a camera selected for video display or remote control, a camera used by another user, and a free camera.

The control panel 64 is displayed below the camera image window 62. The control panel 64 has two buttons, a rotation button for pan and tilt, and a zoom button. By operating these buttons, an arbitrarily designated camera can be rotated and zoomed. If a selected camera cannot be operated (for example, the camera is being operated by another user), both the rotation button and zoom button change to a control disable display state.

For example, when a user wants to access a certain camera (in this case, remote control), the user double-clicks a camera icon representing this camera. Then, the camera control client 56 requests control of the camera of the camera management server 50. The camera management server 50 checks whether control of that camera has already been given to another user by referring to a camera status list (to be described later). If control of the camera is not assigned to another user, the camera management server 50 permits remote control of the camera (including video display as a matter of course); otherwise, denies control. If control is permitted, the camera image window 62 displays an output image from the camera to enable control (pan, tilt, and zoom) on the camera control panel 64.

Further, the first embodiment can select an optimal camera which can monitor a point on the map clicked (single-clicked in this embodiment) with a mouse, and control the camera so as to monitor the image at this point. For example, if the user clicks the mouse on the object of a door 80, the nearest camera 90 is controlled to face the door, and the image of the camera image window 62 is switched to an image from the camera 90. At this time, the display of the camera icon is changed to enable the user to easily know the camera he or she is controlling. For example, the camera icon is changed in color, or flickered for a predetermined time.

These operations are basically the same regardless of which of objects displayed on the map is designated. The present invention can select an optimal camera in consideration of the three-dimensional camera layout, image sensing range, camera use status, and the like. For example, if the user clicks the mouse on the object of a clock 81, a camera 92 at an optimal position for monitoring the clock is selected. There are two cameras 90 and 91 nearer the clock 81 than the camera 92. However, the camera 90 is outside the maximum field angle (doted line in FIG. 4, which is not displayed in practice), and cannot be actually directed to face the clock. Compared to the camera 91, the camera 92 can monitor the clock from its front side in terms of the layout. Although not apparent from the map because of two-dimensional display, the clock is hung high on the wall. The camera 92 is controlled not only to pan toward the clock 81 but also to tilt upward so as to clearly monitor the clock 81. If the camera 92 is controlled by another user, the camera 91 next optimal to monitor the clock 81 is selected. When the user clicks the mouse on the object of a safe 82, the nearest camera is a camera 94, but the camera 94 cannot monitor the safe 82 due to the presence of a wall 83. Thus, the second nearest camera 93 is controlled. Similarly, if the user clicks the icon of the camera 90 with the mouse, the nearest camera 91 is selected, and the user can see the status of the camera 90 (whether the camera 90 has broken or operates) from a remote place by an image from the camera 91.

Note that if the user clicks an area (e.g., 85) other than objects on the map with the mouse, no operation starts in the first embodiment.

Processing for realizing camera control upon clicking the mouse on the map will be explained with reference to FIGS. 5 to 7.

Figure 5:
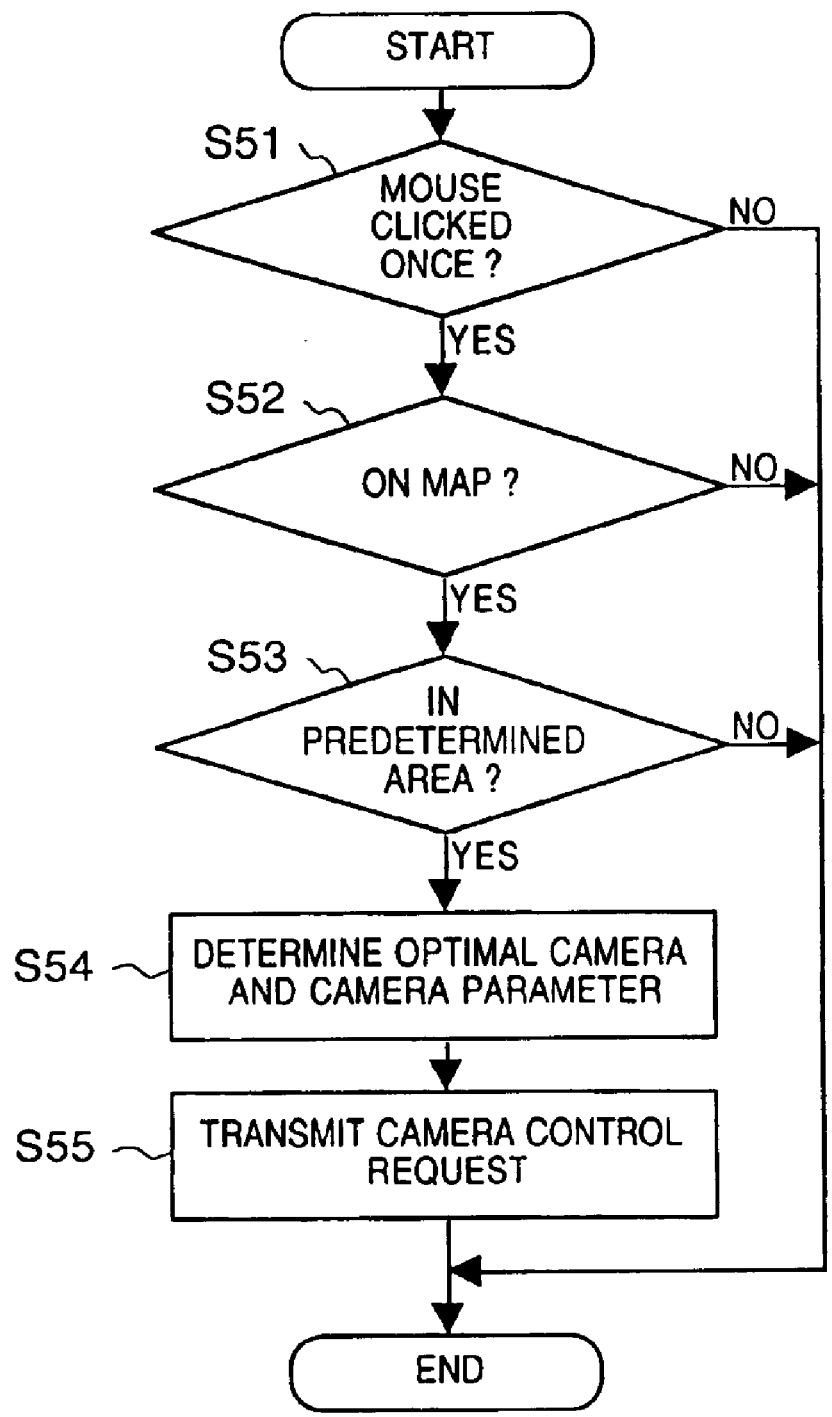
FIG. 5 is a flow chart showing processing by the camera control client.

FIG. 5 shows processing by the camera control client.

The camera control client checks in step S51 whether the mouse has been clicked once, and, if YES in step S51, determines in step S52 whether the mouse was clicked on the map window 60. If NO in step S52, the same processing as normal one is done, and a description thereof will be omitted. If YES in step S52, the camera control client shifts to step S53, and checks from the coordinate position whether the mouse was clicked in a predetermined area. In this embodiment, the predetermined area includes objects (e.g., the door 80, clock 81, safe 82, and camera 90) displayed on the map.

If YES in step S53, the camera control client determines a camera optimal for monitoring the area (object) and its camera parameters with reference to an area table (Step 54: FIG. 6; to be described later). The camera parameters are the pan, tilt, and zoom in the first embodiment, but are not limited to them. The camera parameters may be only the pan and tilt, or a combination of the focus and exposure information may be additionally used. In step S55, the camera control client transmits, to a camera control server for controlling the camera, a camera control request for controlling the camera to desired camera parameters. Then, the camera control client transmits a reception request command for the camera image to video transmission/reception software for transmitting the camera image.

Figure 7:
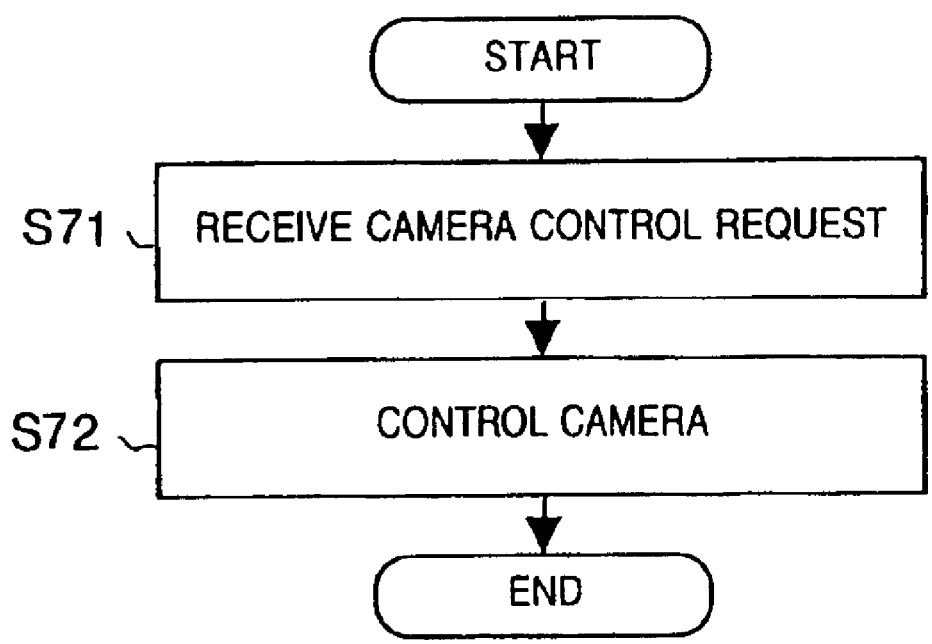
FIG. 7 is a flow chart showing processing by a camera control server.

FIG. 7 shows processing by the camera control server which has received the camera control request issued in step S55. The camera control server receives the camera control request in step S71, and executes camera control in step S72.

FIG. 6 shows details of the area table used in step S54. The area table is comprised of area numbers, camera IDs, and camera parameters. In the list of each area, an upper device has higher priority. For example, when the area 80 (i.e., door object 80) is designated on the map, the camera 90 is first selected as a control candidate. As the camera parameters, (pan angle, tilt angle, zoom ratio) =(0, 10, 2) is selected. If the camera 90 is being controlled by another user, the second listed camera 92 is selected. If the camera 92 is being controlled by another user, an error message such as "the camera cannot be controlled because it is being used by another user" is displayed in a message region 90 in FIG. 4. Whether a camera is being controlled can be determined by an inquiry sent from the camera control client to the camera management server.

Figure 13:
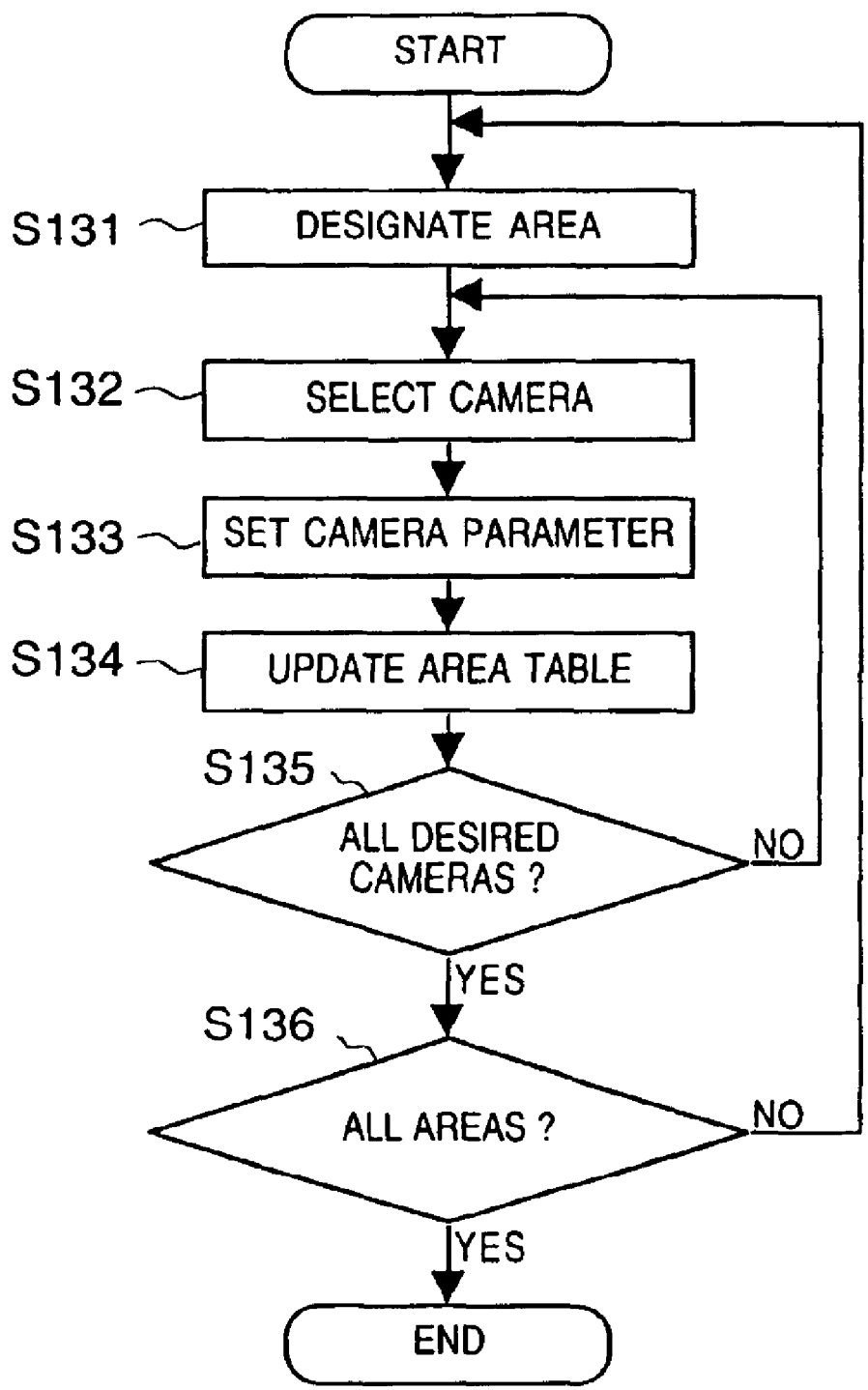
FIG. 13 is a flow chart showing area table setting processing.

FIG. 13 shows an area table setting processing flow.

In this processing, a different table may be set for the camera control client of each video communication terminal. Alternatively, a privileged user (manager) of this surveillance system may set an area table at a specific video communication terminal, and the set area table may be reflected on all camera control clients.

This processing can be set by switching a normal surveillance mode to a setting mode using the same user interface as that in FIG. 4. In the setting mode, camera control or the like is temporarily locked to deny any other access.

In step S131, an area to be set is designated in the map window 60. If an area is partitioned for each object, the area is designated. Alternatively, a rectangular frame which contains the object and has a minimum area may be designated with the mouse. In step S132, a camera which is to be moved when the area designated in step S131 is clicked with the mouse is selected. Then, the direction, field angle, and zoom of the camera can be controlled on the control panel 64, and an image from the camera is displayed on the camera image window 62. The user controls the camera so as to clearly monitor the area (object) (step S133). After proper camera parameters are set, the user clicks a "setting" button (not shown), and then the area table is updated in step S134. This control (from step S132 to step S134) is performed in order of cameras to be actually moved in the normal surveillance mode. Note that when a camera whose camera parameters have been set once is clicked again, the parameters of this camera in the area table are rewritten.

Accordingly, the user interface as shown in FIG. 4 can be implemented by registering in advance camera parameter information about a camera to be selected and its direction and zoom ratio upon designating an object displayed on the map.

(Second Embodiment)

Figure 8:
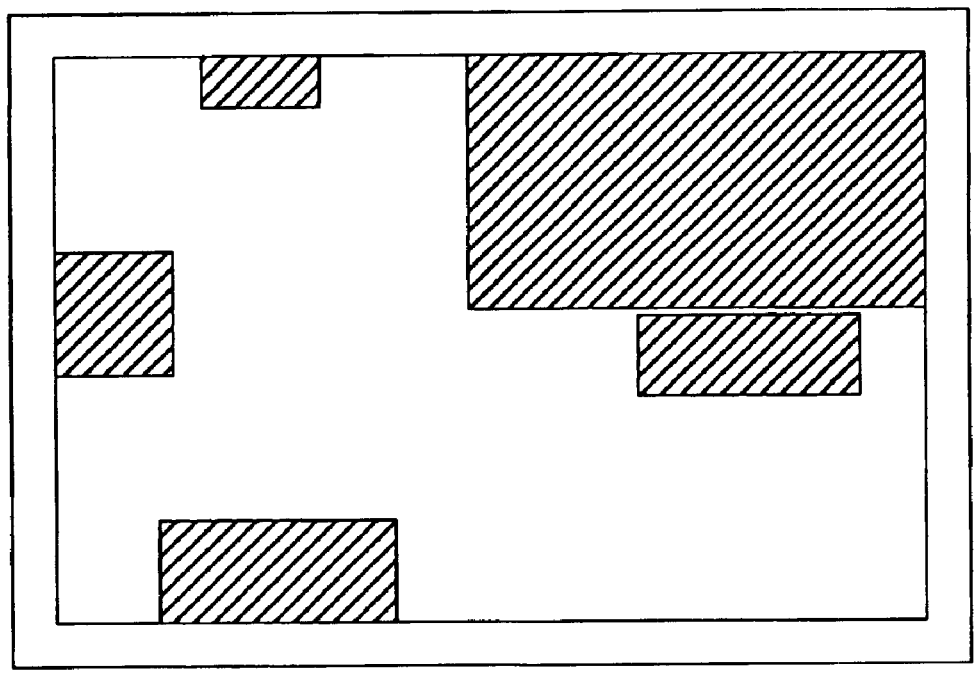
FIG. 8 is a view showing a specific area region in a map window in the second embodiment.

In the first embodiment, when only a specific object displayed on a map is designated, a corresponding camera is selected and controlled. In the second embodiment, a designated portion is not limited to an object. As shown in FIG. 8, rectangular regions having various areas are set as specific areas. When the mouse is clicked in such an area, an optimal camera is selected and controlled so as to photograph an object designated in advance in the selected area.

For example, irrespective of the position in a vault 84 on the map which is clicked, a camera 93 can be immediately directed to a safe 82 which most characterizes the vault.

(Third Embodiment)

In the first embodiment, if a region other than a specific area on a map is designated, like step S53 in FIG. 5, no operation starts. This is effective when a person who manages a camera (camera manager) feels troublesome to determine cameras optimal for monitoring respective regions on a map and their camera parameters for any arbitrary coordinates with the mouse (because only partial regions on the map suffice to be set).

However, some users want to direct a camera to a point (e.g., 85 in FIG. 4) where no object is displayed on the map and to see the image. In the third embodiment, this processing is compensated on the system side without setting in advance any area table for all the coordinates on the map by the camera manager.

This embodiment is additionally executed when the mouse is determined in step S53 of FIG. 4 to be clicked outside a predetermined area. Only the additional processing will be explained with reference to FIGS. 9 to 12.

In step S91, a camera to be controlled is selected from a coordinate position clicked with the mouse on the map. In step S92, the moving amount of the camera to monitor the clicked point is calculated. For example, a moving amount for directing the center of the camera to a direction in which the position clicked on the map and the camera selected in step S91 are connected by a straight line is calculated (if the moving amount exceeds the maximum pan range, the zoom ratio is minimized). In step S93, the calculated moving amount is transmitted as a camera control command to the camera control server of the camera.

FIG. 10 is a flow chart showing a camera selection method in step S91 of FIG. 9. In step S101, the distances between a position ($a$) clicked on the map and all camera icon coordinates are calculated. In step S102, a camera corresponding to an icon nearest to the position $a$ is selected as a candidate camera (camera x). In step S103, whether the straight line which connects the position $a$ and camera x falls within the visible range (field range obtained when the zoom ratio is minimized and the camera is panned maximally) of the camera x is checked. At this time, whether the position $a$ cannot be seen from the camera due to an obstacle such as a wall between $a$ and x is also checked. The visible range is obtained with reference to FIG. 11A or 11B showing a camera state table integrally managed by the camera management server.

FIGS. 11A and 11B are tables showing the structure and contents of the camera state table.

FIGS. 11A and 11B show examples of the camera state table which stores fixed information and variable information of each camera. FIG. 11A shows a camera state table for fixed information, and FIG. 11B shows a camera state table for storing the current value of variable information.

The camera state table shown in FIG. 11A includes the camera number, camera name, host name, camera installation position coordinates on the map, initial direction at the start, maximum zoom ratio, maximum field angle (field angle when the zoom ratio is minimized), and pannable direction θp (p<θp <P) representing a pannable range. θp, p, and P are the angles with respect to the x direction (horizontal direction).

Figure 12:
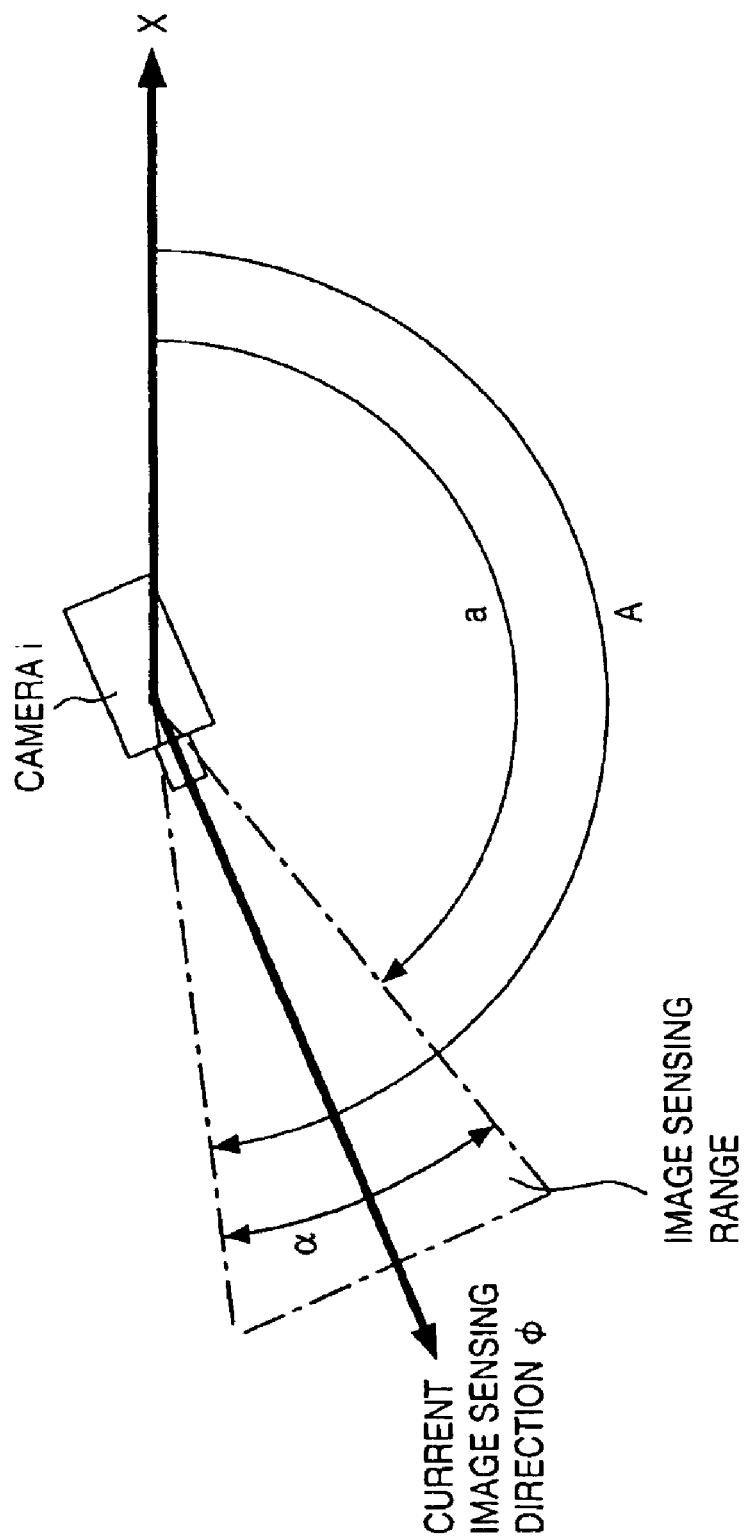
FIG. 12 is a view for explaining the image sensing direction and a image sensing range θ(a, A)

The camera state table shown in FIG. 11B has the camera number, current zoom ratio, current video field angle (obtained by referring to a correspondence table of the zoom ratio and video field angle using a current zoom ratio, as needed), current image sensing direction, and current image sensing range θa (a<θa<A). The image sensing range θa can be calculated from the video field angle and the current image sensing direction. As shown in FIG. 12, letting α be the video field angle, and Φ be the current image sensing direction, $$a = \Phi - \alpha/2$$

$$A = \Phi + \alpha/2$$

where $a$ and A are the angles with respect to the x direction (horizontal direction).

Note that the camera management server integrally manages information such as camera layout information, current direction, and field angle by using the camera state table as shown in FIG. 11A or 11B. Alternatively, the camera control server of the video communication terminal of a camera may manage the information in units of cameras.

Referring back to FIG. 10, if YES in step S103, whether the camera x is being controlled by another user is checked in step S104. If NO in step S103 or S104, the camera x cannot monitor the current point a, and the processing returns to step S102 to select the next candidate camera. In this case, a camera having the second shortest distance is selected as a candidate. Then, the processing shifts to step S105 to determine the camera.

The flow chart in FIG. 10 shows the processing method of selecting a camera icon nearest to the position a clicked with the mouse and controlling the camera. In addition to this processing, the step of checking whether a camera directed to the position a currently exists with reference to variable information of the camera in FIG. 11, and if a camera directed to the position a exists, shifting to step S105 to determine the camera as a candidate may be adopted as step S100 before step S101. If a camera directed to the position a exists, this step can omit the control time for calculating the distances of all cameras and the control time for directing a camera to the position a.

(Fourth Embodiment)

In the first embodiment, one camera optimal for monitoring an area (object) is selected with reference to the area table (FIG. 6) in step S54 of FIG. 5, and the camera is controlled to display an image. In addition to the arrangements of the first to third embodiments, the fourth embodiment has a mode in which a plurality of cameras capable of monitoring an object are selected, and all the selected cameras are directed to a point clicked with the mouse on a map. Switching of the mode is achieved by newly adding a mode switching window on the display screen of FIG. 4.

For example, when the user clicks the mouse on an object 81 (clock) Ian map window 60, the area table in FIG. 6 is referred to to issue a camera control request to the camera control server so as to set predetermined camera parameters in all cameras (in this case, cameras 92 and 91) registered for the object 81. In this case, a camera image window 62 in FIG. 4 can display a plurality of images. This arrangement can control a plurality of cameras by only one object designation, and confirm an object from various angles.

As is apparent from the above description, the above embodiments can control a camera to actually monitor an object on a map designated with a mouse. At this time, a camera optimal for monitoring the object and its camera parameters can be set with a simple user interface. If this camera is being controlled by another user, the next candidate camera is selected to monitor the point.

Even when the user clicks with the mouse not only an object but also a given region (area) on the map, a camera optimal for monitoring the area can be selected to monitor the state of the area.

If the user clicks with the mouse an area other than a predetermined area on the map, no operation starts.

Moreover, even if the user clicks with the mouse an area other than a predetermined area on the map, the nearest camera capable of image sensing the designated point can be selected and directed to the point without setting an optimal camera and its camera parameters.

When the user clicks a predetermined area on the map with the mouse, a plurality of cameras can monitor the point.

The object of the present invention is realized even by supplying a storage medium (or recording medium) storing software program codes for realizing the functions of the above-described embodiments to a system or apparatus, and causing the computer (or a CPU or MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the operating system (OS) running on the computer performs part or all of actual processing on the basis of the instructions of the program codes.

The functions of the above-described embodiments are also realized when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

When the present invention is applied to the above storage medium, the storage medium stores program codes corresponding to the above-described flow charts (shown in FIGS. 5, 7, 9, 10, and 13).

As has been described above, the present invention can improve the camera control operability on a map.

The present invention is not limited to the above embodiments and various changes and modifications can be made within the spirit and scope of the present invention. Therefore, to apprise the public of the scope of the present invention the following claims are made.

What is claimed is:

1. A camera control system for selecting at least one of a plurality of controllable cameras connected to a network, and performing video display and camera control, the system comprising:

map display device;

input device adapted to designate one point on a map displayed by said map display device;

camera selection device adapted to select an optimal camera capable of monitoring the point designated by said input device; and camera control device adapted to control the camera selected by said camera selection device, wherein said camera selection device comprises determination device adapted to determine whether a camera as a selection candidate is being controlled by another user, and selects another camera when the camera as the selection candidate is determined to be controlled by another user.

2. The system according to claim 1, further comprising:

storage device adapted to store information which determines a camera and a camera parameter in advance for each object displayed on the map, and wherein said camera selection device selects a camera on the basis of the information stored in said storage device.

3. The system according to claim 1, further comprising:

storage device adapted to store information which determines a camera and a camera parameter in advance for each specific region on the map, and wherein said camera selection device selects a camera on the basis of the information stored in said storage device.

4. The system according to claim 1, wherein when a point other than a specific region on the map is designated by said input device, said camera selection device does not select any camera.

5. The system according to claim 1, wherein said camera selection device comprises calculation device adapted to calculate distances between the point input by said input device and the plurality of cameras, and selects based on a calculation result of said calculation device the nearest camera capable of sensing an image of the designated point.

6. The system according to claim 1, further comprising:
holding device adapted to hold information about current image sensing ranges of the plurality of cameras; and
determination device adapted to determine based on the information held by said holding device whether a camera currently sensing an image of the point designated by said input device exists, and
wherein said selection device selects the camera which is determined by said determination device to be currently sensing the image of the designated point.

7. The system according to claim 1, wherein
said camera selection device can select a plurality of cameras capable of sensing an image of one point input by said input device, and
said camera control device controls the plurality of cameras to the point input by said input device.

8. The system according to claim 1, further comprising:
a setting device adapted to set a camera to be controlled and a camera parameter in accordance with the point designated on the map; and
a storage device adapted to store information about the camera and the camera parameter that are set by said setting device.

9. A camera control method of selecting at least one of a plurality of controllable cameras connected to a network, and performing video display and camera control, the method comprising:
a display step of displaying a map on a display;
a designation step of designating one point on the map displayed in the display step;
a camera selection step of selecting an optimal camera capable of monitoring the point designated in the designation step; and
a control step of controlling the camera selected in the camera selection step,
wherein the camera selection step comprises a determination step of determining whether a camera as a selection candidate is being controlled by another user, and comprises selecting another camera when the camera as the selection candidate is determined to be controlled by another user.

10. The method according to claim 9, further comprising:
the storage step of storing information which determines a camera and a camera parameter in advance for each object displayed on the map, and
wherein the camera selection step comprises selecting a camera on the basis of the information stored in the storage step.

11. The method according to claim 9, further comprising:
the storage step of storing information which determines a camera and a camera parameter in advance for each specific region on the map, and
wherein the camera selection step comprises selecting a camera on the basis of the information stored in the storage step.

12. The method according to claim 9, wherein the camera selection step comprises, when a point other than a specific region on the map is designated in the designation step, not selecting any camera.

13. The method according to claim 9, wherein the camera selection step comprises the calculation step of calculating distances between one point designated in the designation step and the plurality of cameras, and comprises selecting based on a calculation result in the calculation step the nearest camera capable of sensing an image of the designated point.

14. The method according to claim 9, further comprising:
the holding step of holding information about current image sensing ranges of the plurality of cameras; and
the determination step of determining based on the information held in the holding step whether a camera currently sensing an image of the point designated in the designation step exists, and
wherein selection step comprises selecting the camera which is determined in the determination step to be currently sensing image of the designated point.

15. The method according to claim 9, wherein
the camera selection step comprises selecting a plurality of cameras capable of sensing an image of the point designated in the designation step, and
the control step comprises controlling the plurality of cameras to the point input in the designation step.

16. The method according to claim 9, further comprising:
a setting step of setting a camera to be controlled and a camera parameter in accordance with the point designated on the map; and
a storage step of storing information about the camera and the camera parameter that are set in the setting step.

17. A storage medium storing a control program of selecting at least one of a plurality of controllable cameras connected to a network, and performing video display and camera control, wherein
the control program comprises:
a code of a display step of displaying a map on a display;
a code of a designation step of designating one point on the map displayed in the display step;
a code of a camera selection step of selecting an optimal camera capable of monitoring the point designated in the designation step; and
a code of a control step of controlling the camera selected in the camera selection step,
wherein a camera selection step comprises a determination step of determining whether a camera as a selection candidate is being controlled by another user, and comprises selecting another camera when the camera as the selection candidate is determined to be controlled by another user.

18. The medium according to claim 17, wherein
the code of the camera selection step comprises selecting a plurality of cameras capable of sensing an image of the point designated in the designation step; and
the code of the control step comprises controlling the plurality of cameras to the one point input in the designation step.

19. The medium according to claim 17, wherein the control program further comprises:
a code of the setting step of setting a camera to be controlled and a camera parameter in accordance with the point designated on the map; and a code of the storage step of storing information about the camera and the camera parameter that are set in the setting step.

20. A camera system for selecting at least one of a plurality of controllable cameras connected to a network, and performing video display and camera control, the system comprising:

map display device;

setting device adapted to set tables which include relation between a point to be designated on the map and a camera to be selected, and are different for each of monitoring clients;

input device adapted to designate one point on a map displayed by said map display device;

camera selection device adapted to select an optimal camera capable of monitoring the point designated by said input device; and camera control device adapted to control the camera selected by said camera selection device, wherein said camera selection device selects the optimal camera in accordance with the tables set by said setting device.

21. The camera system according to claim 20, wherein the tables include information about relation between an area on the map and a camera to be selected by said selection device.

22. The camera system according to claim 21, wherein the tables include information about a parameter of the camera to be selected.

23. The camera system according to claim 22, wherein the camera parameter is at least one information of a pan, a tilt, and a zoom.

24. The camera system according to claim 20, wherein the information of the tables is changed by a privileged monitoring client.

25. A camera control method of selecting at least one of a plurality of controllable cameras connected to a network, and performing video display and camera control, the method comprising:

a display step of displaying a map on a display;

a setting step of setting tables which include relation between a point to be designated on the map and a camera to be selected, and are different for each of monitoring clients;

a designation step of designating one point on the map displayed in the display step;

a camera selection step of selecting an optimal camera capable of monitoring the point designated in the designation step; and a control step of controlling the camera selected in said camera selection step, wherein the camera selection step selects the optimal camera in accordance with the tables set in said setting step.

26. A storage medium storing a control program of selecting at least one of a plurality of controllable cameras connected to a network, and performing video display and camera control, the control program comprising:

a code of a display step of displaying a map on a display;

a code of a setting step of setting tables which include relation between a point to a camera to be selected, and are different for each of monitoring clients;

a code designation step of designating one point on the map displayed in the display step;

a code of a camera selection step of selecting an optimal camera capable of monitoring the point designated in the designation step; and a code of a control step of controlling the camera selected in said camera selection step, wherein the camera selection step selects the optimal camera in accordance with the tables set in said setting step.

* * * * *

UNITED STATES PATENT AND TRADEMARK OFFICE
CERTIFICATE OF CORRECTION

PATENT NO. : 6,909,458 B1
DATED : June 21, 2005
INVENTOR(S) : Suzuki et al.

It is certified that error appears in the above-identified patent and that said Letters Patent is hereby corrected as shown below:

Column 2,
Line 65, change "range θ(a, A)" to -- range θ a (a, A) --;

Column 7,
Line 4, change "=(0, 10, 2)" to -- = (0, 10, 2) --;

Column 9,
Line 16, change the second occurrence of "a" to -- $\underline{a}$ --;
Line 21, change "a" to -- $\underline{a}$ --;

Column 14,
Line 22, change "point to a camera" to -- point to be designated on the map and a camera --; and
Line 24, change "a code designation" to -- a code of a designation --.

Signed and Sealed this

Seventh Day of February, 2006

JON W. DUDAS
*Director of the United States Patent and Trademark Office*